(12) United States Patent
Aumard et al.

(10) Patent No.: US 6,318,185 B1
(45) Date of Patent: Nov. 20, 2001

(54) COMPRESSION STRESS SENSOR

(75) Inventors: Jean-Pierre Aumard, Etrembières; Jean-Claude Navarro, Ville-la-Grand, both of (FR)

(73) Assignee: S.C.A.I.M.E. S.A., Annemasse (FR)

( * ) Notice: Subject to any disclaimer, the term of this patent is extended or adjusted under 35 U.S.C. 154(b) by 0 days.

(21) Appl. No.: 09/374,270

(22) Filed: Aug. 16, 1999

(30) Foreign Application Priority Data

Sep. 16, 1998  (CH) ................................................. 1891/98

(51) Int. Cl.[7] .............................. G01N 3/08; G01L 1/00; G01D 1/16
(52) U.S. Cl. ................................. 73/818; 73/855; 73/790
(58) Field of Search .............................. 73/760, 774, 788, 73/790, 818, 839, 852, 855, 856, 860

(56) References Cited

U.S. PATENT DOCUMENTS

| 4,522,066 | * | 6/1985 | Kistler et al. ........................... 73/855 |
| 4,647,038 | * | 3/1987 | Noffsinger ............................. 272/123 |
| 5,065,631 | * | 11/1991 | Ashpitel et al. ........................ 73/849 |
| 5,648,617 | * | 7/1997 | Cullen et al. .................... 73/862.045 |

* cited by examiner

*Primary Examiner*—Benjamin R. Fuller
*Assistant Examiner*—Maurice Stevens
(74) *Attorney, Agent, or Firm*—Young & Thompson

(57) ABSTRACT

The invention is concerned with a compression stress sensor having a proof body (1) and strain gauges (7) connected together to form a Wheatstone bridge. The proof body (1) is made as a single piece from a monolithic rod which is cylindrical or prismatic with a circular or a regularly polygonal transverse section. This rod (1) is traversed in its median part by at least one pair of passages (3, 4) orthogonal one with respect to the other and located in a plane perpendicular to the longitudinal axis (X) of the proof body (1) to define between them independent measure columns (5). The end faces (2, 2a) of the proof body provide bearing faces receiving the forces to be measured and a strain gauge (7) is fixed to a surface of each independent measure column (5).

15 Claims, 9 Drawing Sheets

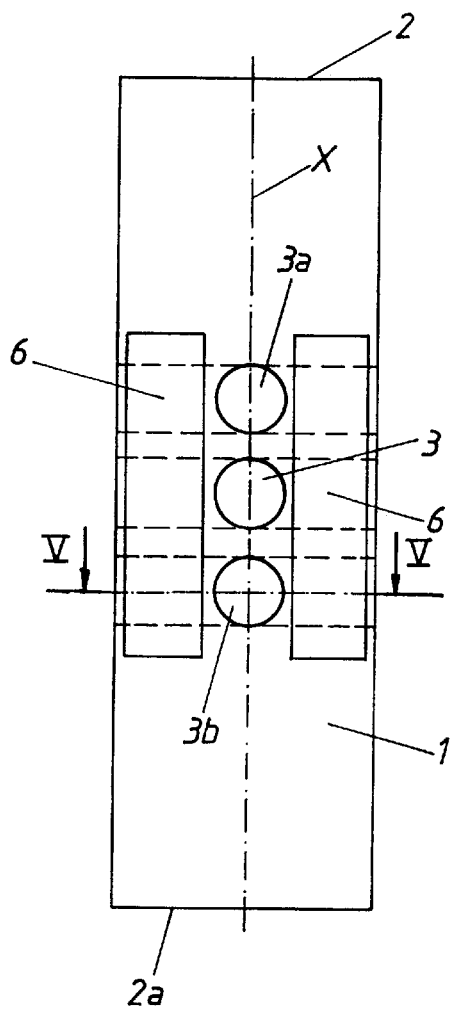
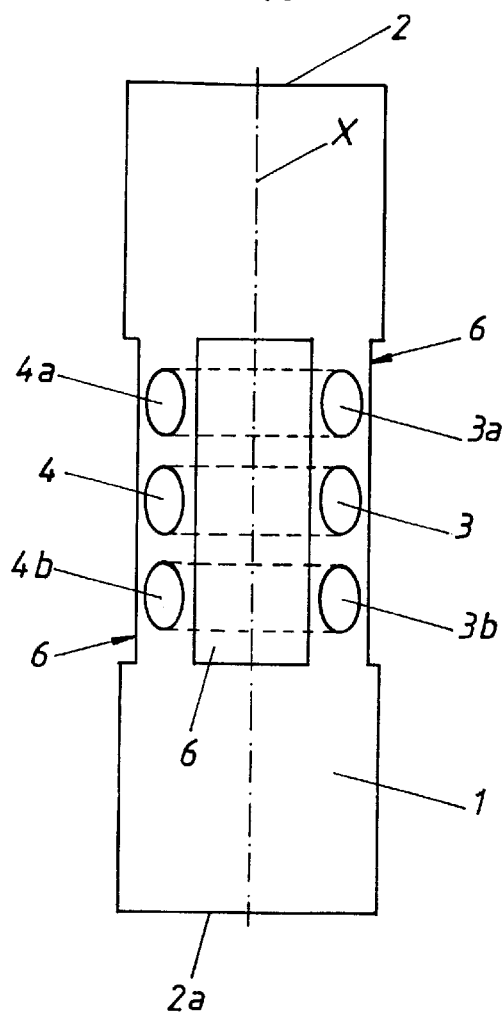
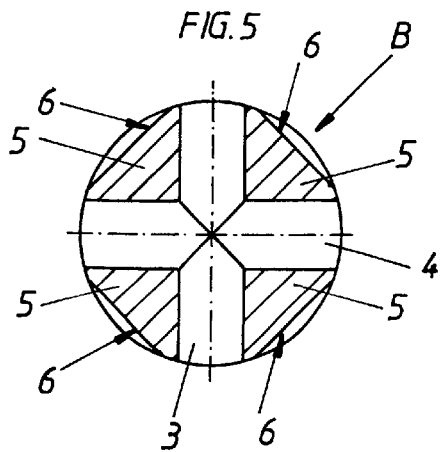

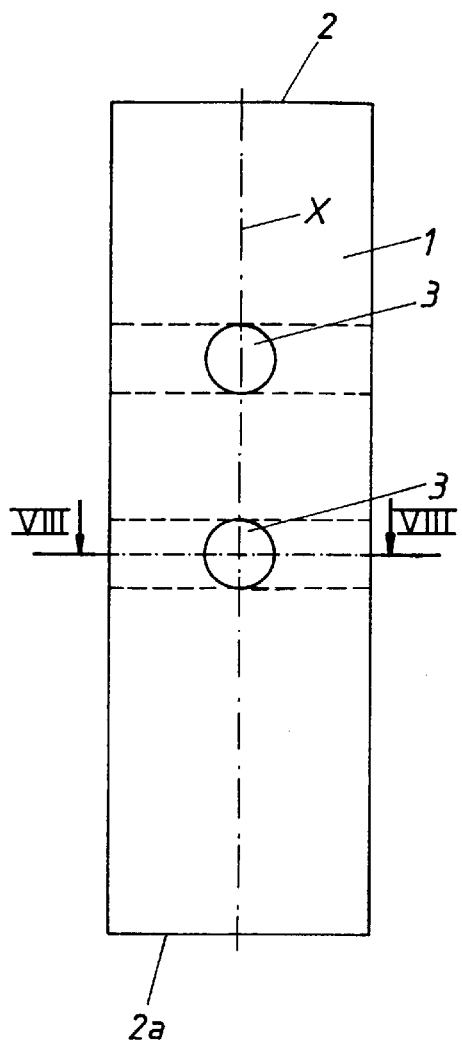
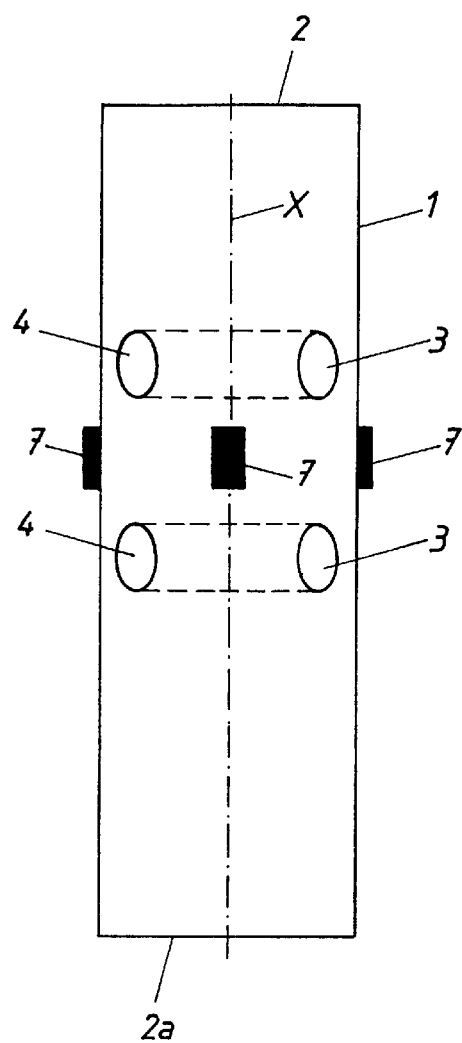
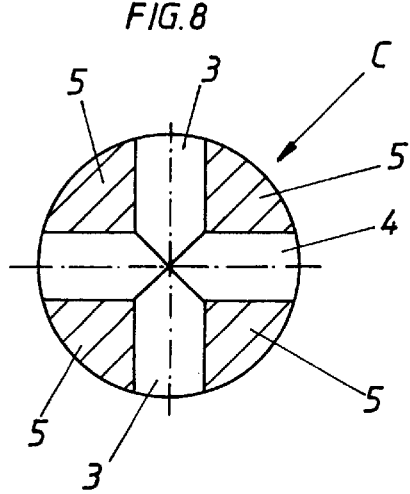

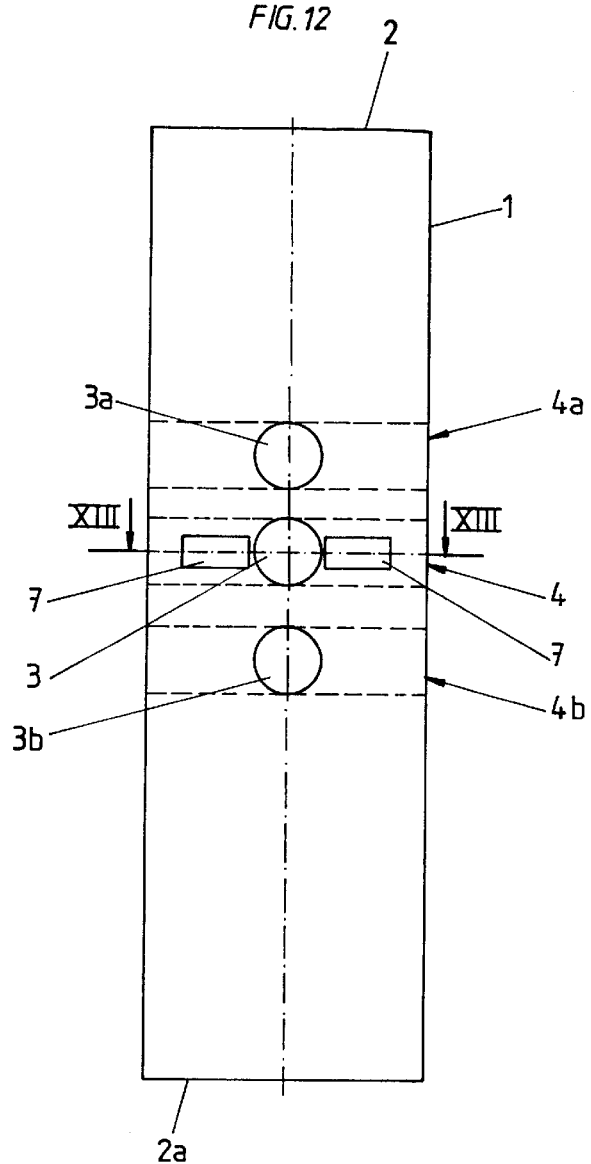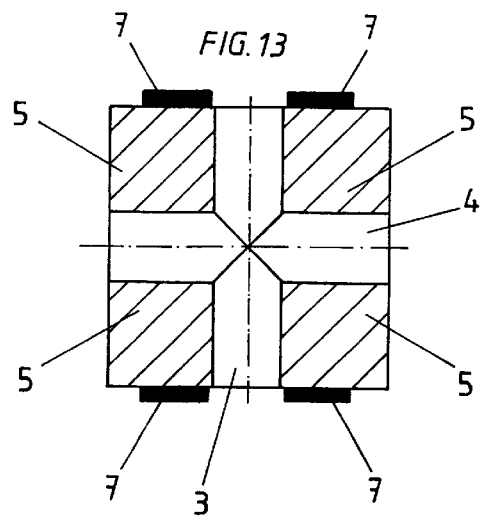

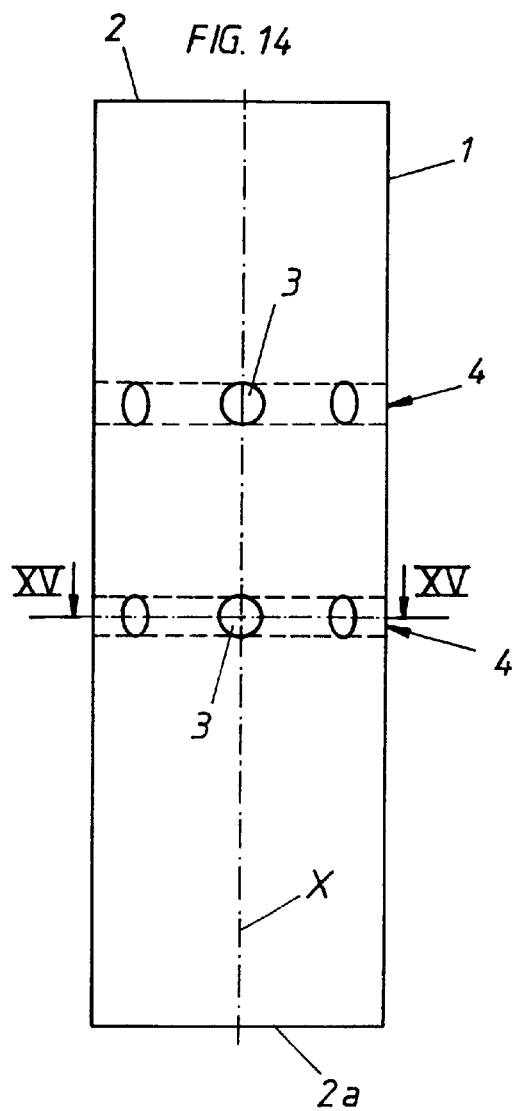
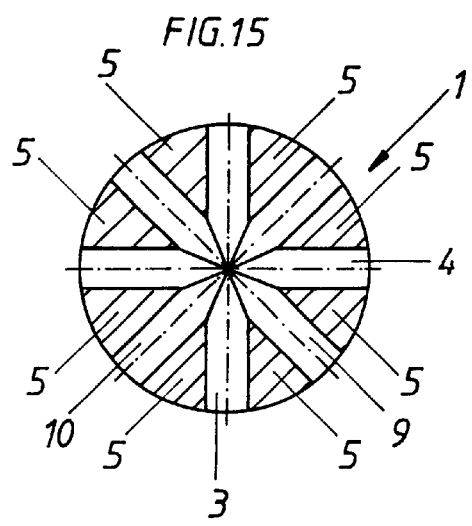

COMPRESSION STRESS SENSOR

The present invention is aimed at a compression stress sensor of the type including a proof body which is subjected to compression stresses along its longitudinal axis of symmetry; strain gauges being affixed to the surfaces of this proof body and connected together electrically to produce an output signal proportional to the compression of the proof body. The main objectives which the present invention proposes to achieve are:

1. To provide a sensor of which the proof body is monolithic and made of a single piece, in order to ensure a good distribution of the strains in the different measure zones.

2. To provide a sensor of which the proof body can be obtained through a limited number of machining operations which are simple, from a single rod of material 3. To provide a sensor having a small number of strain gauges affixed to surfaces of the proof body which undergoes, under the effect of variable compression stresses, a deformation along the longitudinal axis of said proof body. By achieving theses three objectives, a compression stress sensor is obtained which is simple to manufacture, reliable and inexpensive.

The compression stress sensor according to the present invention includes a proof body with a longitudinal axis of symmetry and exhibiting at each one of its ends a bearing face. It is intended for being subjected to a compression stress applied on said bearing faces. This proof body has at least one surface on which are affixed strain gauges. This compression stress sensor is characterised by the features set forth in claim 1.

The appended drawing illustrates schematically and by way of example several embodiments of the compression stress sensor according to the invention.

FIG. 4 is an elevation view of a second embodiment of a proof body.

FIG. 5 is a cross-sectional view taken along line V—V of FIG. 4.

FIG. 6 is an elevation view of the proof body illustrated in FIGS. 4 and 5, in the direction of arrow B of FIG. 5.

FIG. 7 is an elevation view of a third embodiment of the proof body.

FIG. 8 is a cross-sectional view taken along line VIII—VIII of FIG. 7.

FIG. 9 is an elevation view, in the direction of arrow C of FIG. 8.

FIG. 12 is an elevation view of a proof body having a square cross-section.

FIG. 13 is a cross-sectional view taken along line XIII—XIII of FIG. 12.

FIG. 14 is an elevation view of a cylindrical proof body.

FIG. 15 is a cross-sectional view of the proof body of FIG. 14, taken along line XV—XV.

As will be seen in the detailed description which follows of several embodiments of the compression stress sensor according to the invention, this sensor is comprised of a proof body which is monolithic, i. e. obtained through machining from a single piece or rod of material, generally steel or stainless steel.

This monolithic proof body has the general shape of a prism or of a cylinder with a circular or a polygonal transverse section and has a longitudinal axis of symmetry. The ends of this proof body provide bearing faces on which are applied the axial compressive forces which are to be measured.

As will be described, simple machining operations are carried out on this monolithic proof body to form therein at least four independent measure columns.

Owing to the fact that these independent measure columns are all made integral with the longitudinal ends of the proof body, these columns are only subjected to compression strains when forces parallel to the longitudinal axis of the proof body are applied on these bearing end faces, even if such forces are not rigorously centered on this longitudinal axis of symmetry.

Accordingly, it is possible to measure the compression strains generated, by a single compression measure on each column, which reduces considerably the number of strain gauges necessary to one per column and makes it possible to provide a sensor which is cheaper than the compression sensor currently available having non-monolithic columns.

Furthermore, owing to the fact that the proof body is monolithic, one avoids all sources of secondary effects which tend to compromise the transmission of strains into the measure columns. One also avoids that the measure columns be subjected to flexion or shear stresses which are prejudicial to the measure of compression strains.

Figure 1:
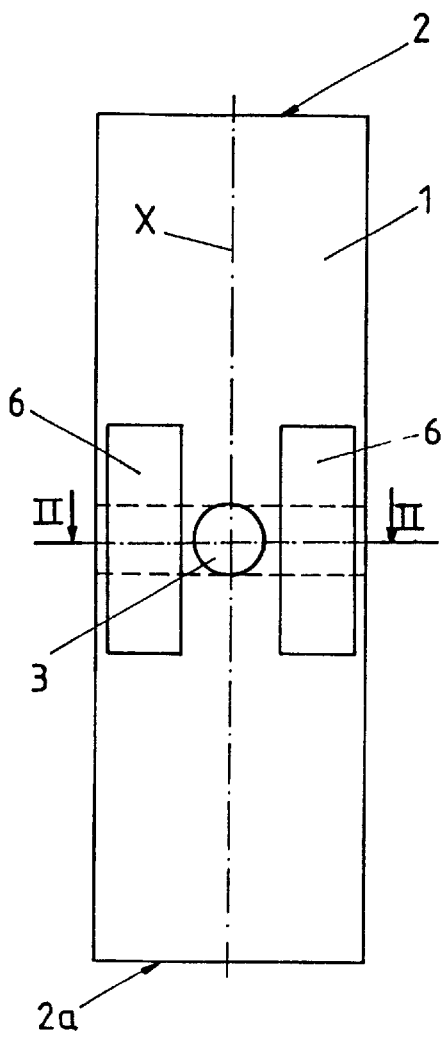
FIG. 1 is an elevation view of the proof body according to a first embodiment.
Figure 3:
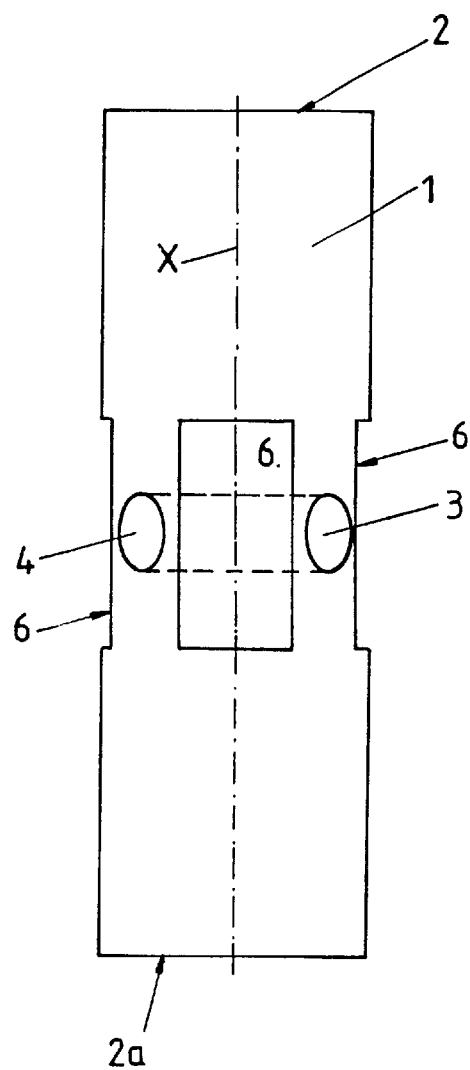
FIG. 3 is an elevation view of the proof body illustrated in FIGS. 1 and 2, in the direction of the arrow A of FIG. 2.
Figure 2:
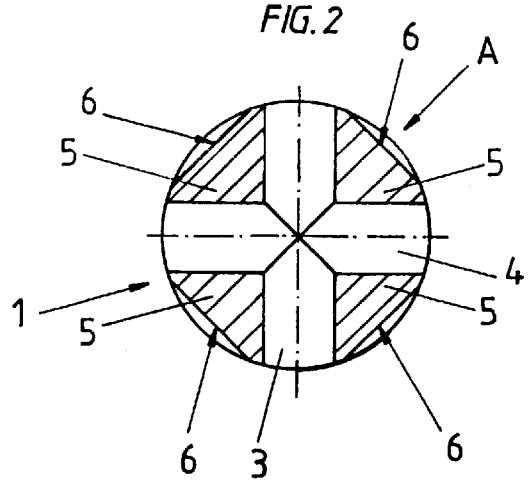
FIG. 2 is a cross-sectional view of the proof body illustrated in FIG. 1, taken along line I–II.

The first embodiment of the sensor illustrated in FIGS. 1 to 3 includes a proof body comprised of a cylindrical rod 1 which is circular in its transverse section.

The ends of the rod 1 exhibit bearing surfaces 2, 2a, to which are applied the forces to be measured along a direction substantially parallel to the longitudinal axis X of the rod 1.

Approximately in the middle of its length, the rod 1 is traversed by two bores 3, 4, which are orthogonal one with respect to the other and perpendicular to the longitudinal axis of the rod 1.

These bores 3, 4 define between them four independent measure columns 5.

Flat facets 6 are machined on the outer surface of the rod 1 to extend longitudinally on both sides of the bores 3, 4. These facets 6 are orthogonal one with respect to the other and are located symmetrically with respect to the bores 3, 4.

On these flat facets 6, there are affixed by any known means strain gauges, one per facet 6, and of which the resistance varies in proportion with the longitudinal deformation of the columns 5.

These strain gauges are mounted in a Whetstone bridge delivering, for a constant supply voltage, a measured voltage which is proportional to the sum of the compression strains generated in the four columns by the forces applied on the bearing faces 2, 2a of the rod 1.

In a second embodiment illustrated in FIGS. 4 to 6, the proof body also consists of a cylindrical rod which has a circular transverse section, a longitudinal axis of symmetry X and end or bearing faces 2, 2a.

As in the first embodiment, a pair of orthogonal bores 3, 4 are machined perpendicularly to the longitudinal axis X of the rod 1, substantially in the middle of its length.

This proof body 1 further has two pairs of orthogonal bores 3a, 4a and 3b, 4b perpendicular to the longitudinal axis X, aligned with the corresponding bores 3, 4 and disposed one on each side of these bores 3, 4.

The flat facets 6 receiving the strain gauges are longer than in the first embodiment and extend over a distance at least equal to that by which the bores 4a, 4b and 3a, 3b are spaced apart.

These bores 3, 3a, 3b and 4, 4a, 4b also generate independent measure columns as in the first embodiment, the height of these columns being greater than in the first embodiment.

In this embodiment, the strain gauges are also affixed to the faces 6. Should one wish to increase the insensitivity to parasitic stresses, he can affix two strain gauges or more to each facet 6.

In the embodiment illustrated in FIGS. 7 to 9, the proof body is a cylindrical rod 1 with a circular transverse section and of which the end faces provide bearing faces 2, 2a.

This rod 1 is traversed by two pairs of bores 3, 4 which are situated each one on one side of its median section and which are orthogonal one with respect to the other and perpendicular to the longitudinal axis X of rod 1.

These bores define zones 5 on a section of rod 1 extending over the distance by which the two pairs of holes are spaced apart. The compression stresses concentrate in these zones which provide four independent measure columns.

The strain gauges 7 are affixed to the peripheral surface of the zones 5 between the bores 3, 4, to transform the variations in the length of the measure columns produced by the effect of the forces applied to the bearing faces 2, 2a, into variations of a measured electric current.

In this embodiment, the strain gauges are integral with a flexible support which can be applied on the peripheral cylindrical surface of rod 1.

Figure 10:
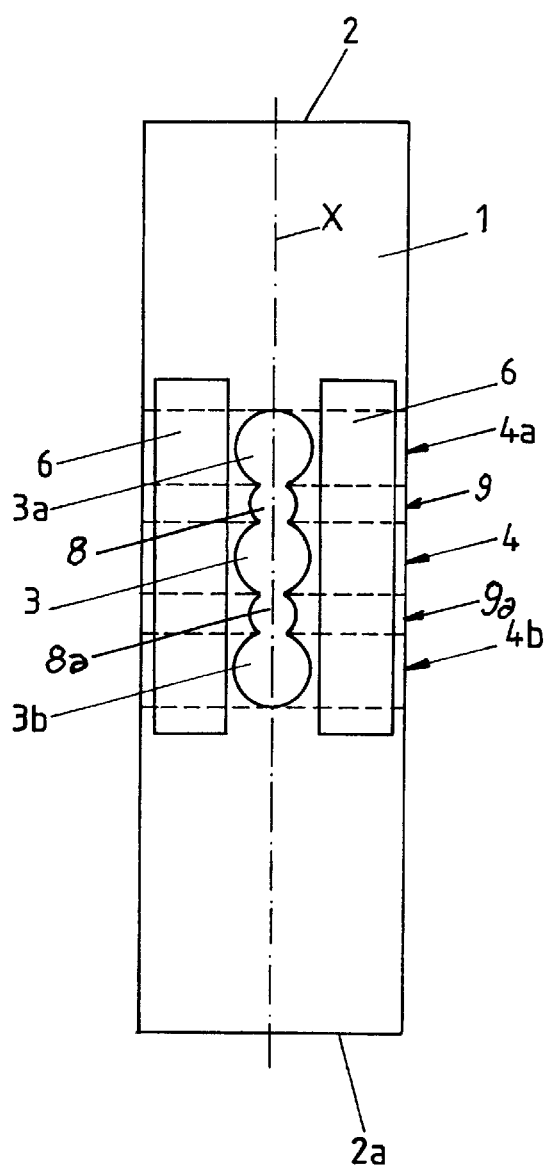
FIGS. 10 and 11 are elevation views of two other embodiments of the proof body.

The embodiment illustrated in FIG. 10 includes a proof body comprised of a cylindrical rod 1 with a circular transverse section, having two pairs of bores 3, 4; 3a, 4a; 3b, 4b orthogonal one with respect to the other and aligned, as well as facets 6 for receiving strain gauges.

Between the pairs of bores 3, 4; 3a, 4a; 3b, 4b, there are secondary bores 8, 9; 8a, 9a which are orthogonal one with respect to the other and perpendicular to the longitudinal axis X of the rod 1. These secondary bores 8, 9; 8a, 9a are aligned with the pairs of bores 3, 4; 3a, 4a; 3b, 4b, and intersect each one with two of them. Transverse hollows are thus formed extending over a distance defined by the height of the rod 1. The solid sections of the rod 1 between these hollows provide four measure columns.

Figure 11:
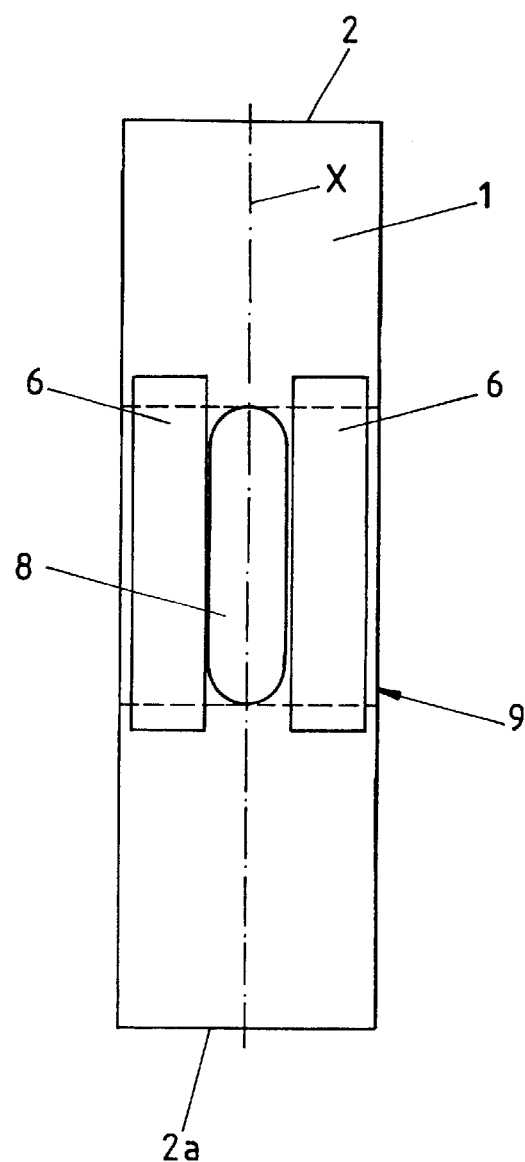

In the embodiment illustrated in FIG. 11, the proof body has the shape of a cylindrical rod 1 with a circular transverse section and with end faces providing bearing surfaces 2, 2a. This rod 1 has, in its central part, longitudinal through slots or channels 8, 9, which are orthogonal one with respect to the other and perpendicular to the longitudinal axis X of the rod 1.

As in some of the preceding embodiments, flat facets 6 are machined in the peripheral surface of the rod 1. The plane of these faces is perpendicular to bisector planes of the longitudinal planes of symmetry of the slots 8, 9. The facets 6 are designed for receiving each one, one or more strain gauges. The hollows determined by the transverse slots 8, 9 define four independent measure columns in the proof body.

In the embodiment illustrated in FIGS. 12 and 13, the proof body is comprised of a prismatic rod 1 having a square transverse section and end faces providing bearing faces 2, 2a.

In the embodiment illustrated, three pairs of transverse bores 3, 3a, 3b; 4, 4a, 4b which are orthogonal one with respect to the other and perpendicular to the longitudinal axis X of the rod are machined therein. These bores define independent measure columns 5 in the rod 1.

Strain gauges 7 are applied against the peripheral surface of the rod 1 in a zone thereof including the columns 5.

Preferably, and for ensuring easy fastening and connecting, these strain gauges 7 are arranged on opposite faces of the rod 1. However, these gauges can be arranged elsewhere.

FIGS. 14 and 15 illustrate an embodiment similar to that illustrated in FIGS. 7, 8 and 9, having a cylindrical proof body 1 with a circular transverse section and end faces forming two bearing surfaces 2, 2a.

In this embodiment, the proof body includes eight pairs of bores 3, 4, 9, 10 perpendicular to the longitudinal axis X of the rod 1 and uniformly distributed around this axis X. These bores thus define eight independent measure columns 5, the peripheral surface of each one thereof being provided with at least one strain gauge.

Figure 16:
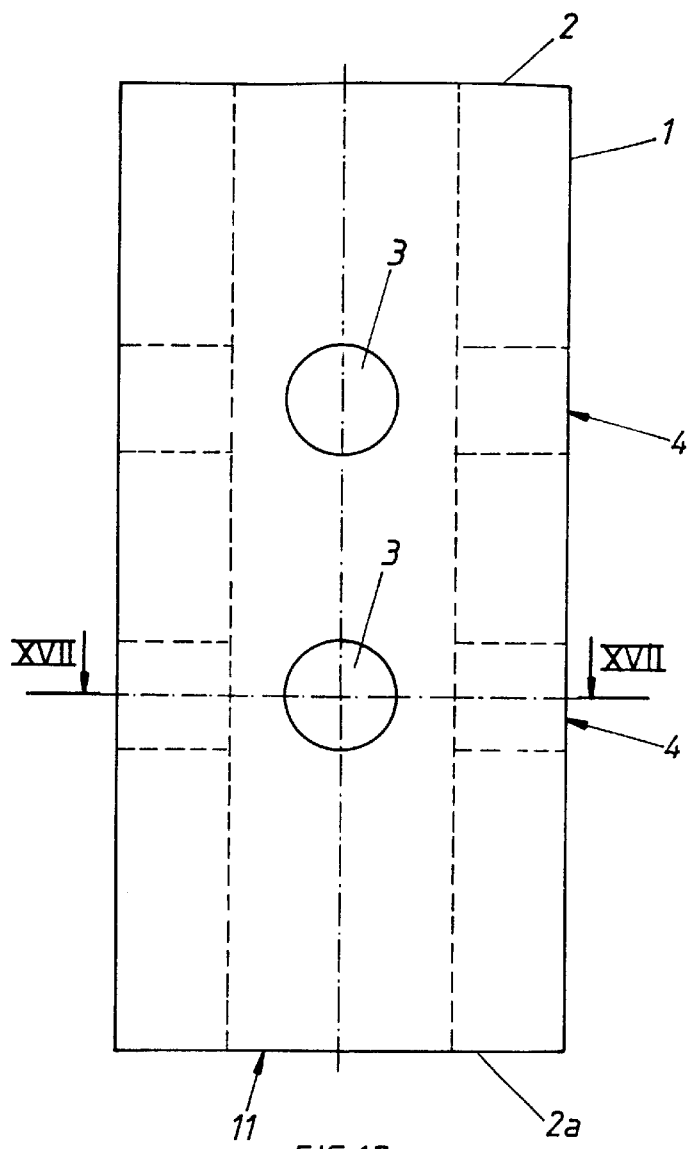
FIG. 16 is an elevation view of a tubular proof body.
Figure 17:
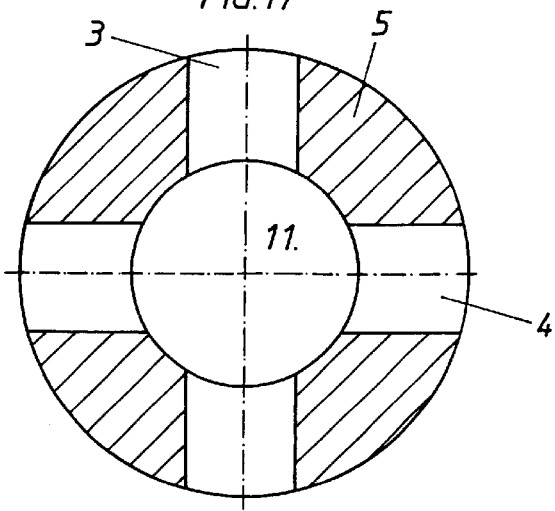
FIG. 17 is a cross-sectional view taken along line XVII—XVII of FIG. 16.

The embodiment illustrated in FIGS. 16 and 17 is also similar to that of FIGS. 7 and 9, except that the rod 1 forming the proof body is tubular, said rod 1 having a central axial bore 11.

Figure 18:
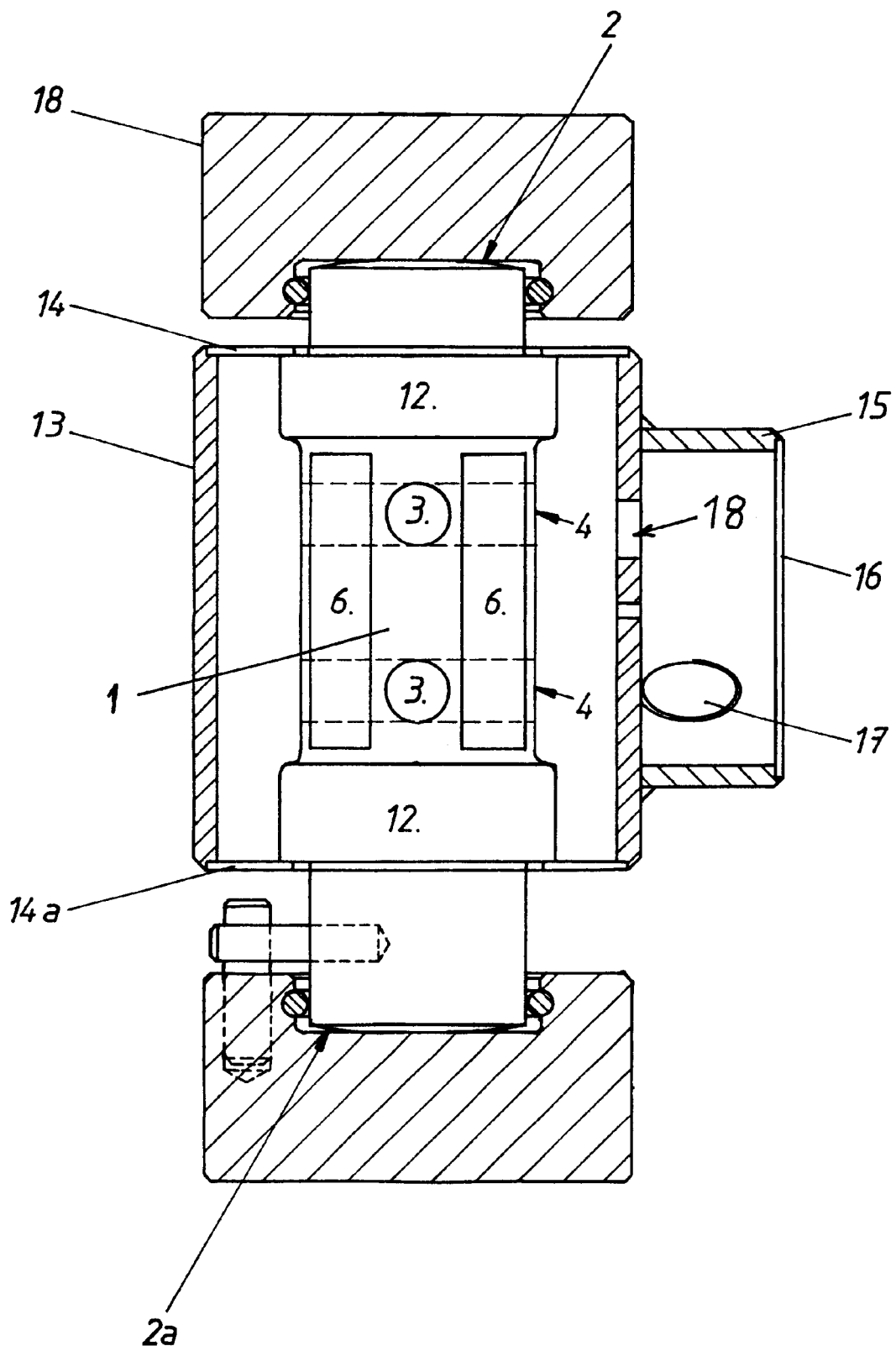
FIG. 18 illustrates, partly in cross-section, a sensor housed in a sealed housing and wherein the ends of the proof body are in contact with load plates.
Figure 19:
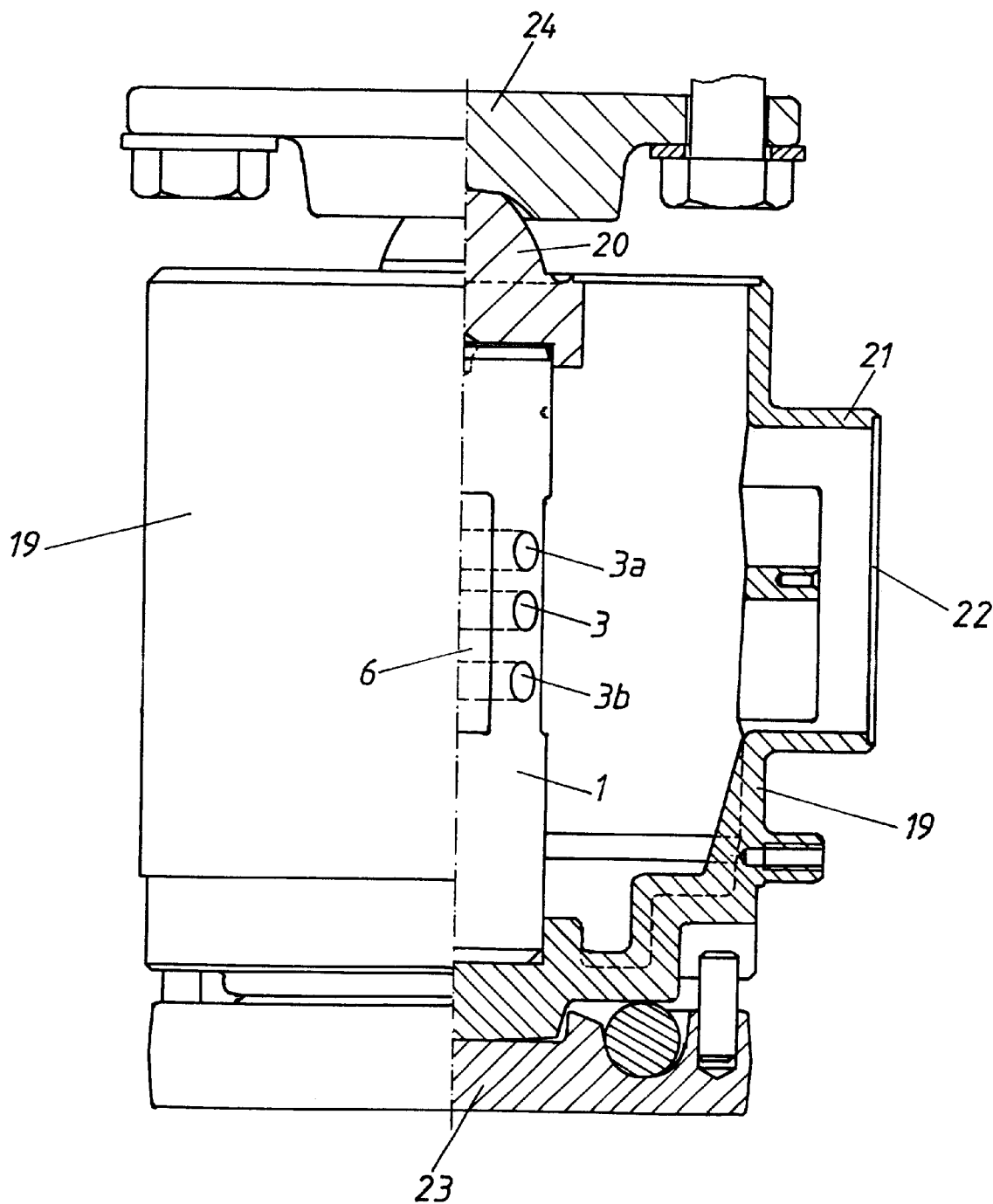
FIG. 19 illustrates, partly in cross-section, another method of mounting the sensor between load plates.

The strain gauges are affixed to the inner wall or to the outer wall of the measure columns 5 in the median zone of the rod 1. Depending on the environment in which the sensors are to operate, a protection against external agents may be necessary. FIGS. 18 and 19 illustrate, in cross-section, two sensors provided with a protection, in their operating position.

The sensor illustrated in FIG. 18 has a cylindrical proof body 1 with a circular transverse section and is provided, as was described previously, with two pairs of bores 3, 4, one orthogonal with respect to the other and perpendicular to the longitudinal axis X of the proof body 1. Flat facets 6 are machined on the peripheral surface of the median portion of the proof body 1.

In this version, the end faces of the proof body 1 are rounded and form two spherical bearing faces 2, 2a. Between these bearing faces 2, 2a and the median portion having the facets 6, the proof body has protruding sections 12 of an increased diameter of which the annular surfaces directed towards the bearing faces 2, 2a are contained in a plane perpendicular to the longitudinal axis of symmetry of the proof body 1.

A housing protects the functional part of the proof body 1. This housing has a tubular part 13 surrounding the proof body 1 and two annular flanges 14, 14a welded, on the one hand, to the ends of this tubular part 13 and, on the other hand, to the sections 12 with an increased diameter of the proof body. This tubular part 13 is provided on a side with a welded housing 15 closed with a cover 16, also welded. Holes 18 allow communication between the inside of housing 15, 16 and the inside of the tubular protection 13, 14, for electrical wires necessary for connecting the strain gauges affixed to the facets 6 to the electrical part of the measuring system, Wheatstone bridge, etc . . . , housed in the housing 15, 16.

An orifice 17 in the housing 15, 16 makes it possible to connect the electrical wires connected to the measuring bridge, to a measuring apparatus or an apparatus for a remote transmission of the measures. The bearing faces 2, 2a of the proof body abut against the flat faces of a stress transmitting member or plate 18.

In this manner, the proof body, the strain gauges and the electrical measuring part are hermetically sealed and protected from the environment.

Another in situ mounting of the sensor is illustrated in FIG. 19. The proof body 1, of the type illustrated in FIGS. 4 to 6, is placed in a housing 19. The free end of the proof body 1 receives a stress-transmitting body 20 having a hemispherical upper surface. An annular wall 21 is welded between this transmitter body 20 and the cup 19. This cup has on its side a housing 21 for receiving the electrical measuring components, which housing is closed by a disk 22 welded thereto.

The cup 19 is borne by a bearing part 23, while another bearing part 24 is in contact with the transmitter body 20.

The strain gauges, when they are subjected to a compression along the axis of their strands, undergo a decrease of their resistance and when they are oriented in a direction perpendicular to the former while remaining in the same plane undergo an increase in their resistance by the effect of the Poisson ratio of the material.

By placing on two opposite measure columns 5 strain gauges oriented in such a manner that their resistance decreases upon compression of these two columns 5 and by placing on the two other measure columns 5 of the same proof body 1 strain gauges oriented in such a manner that their resistance increases upon compression of the corresponding columns 5, one achieves a maximum sensitivity in the measurements, when a Wheatstone bridge is used.

What is claimed is:

1. A compression stress sensor comprising:

a body comprising a monolithic rod having a longitudinal axis of symmetry, the monolithic rod having two end faces that provide bearing surfaces to receive forces to be measured along the longitudinal axis, the monolithic rod having at least one pair of traversing open passages formed as apertures passing therethrough so that said passages are orthogonal to one another and said passages within a given said pair intersect one another, each said passage lying in a plane perpendicular to the longitudinal axis, so that the passages define measurement columns therebetween; and a strain gauge fixed to a surface of each said measurement column.

2. A sensor according to claim 1, wherein each of the traversing passages is a bore.

3. A sensor according to claim 1, wherein the traversing passages are shaped as longitudinal slots or channels.

4. A sensor according to claim 1, wherein the traversing passages comprise overlapping bores with parallel axes.

5. A sensor according to claim 1, wherein the body comprises a plurality of said pairs of traversing passages disposed along the longitudinal axis of the body with the pairs aligned with one another.

6. A sensor according to claim 1, wherein the body has traversing passages in a median part thereof and flat facets on a periphery of the monolithic rod, located between said passages and designed for receiving strain gauges.

7. A sensor according to claim 1, wherein a transverse section of the monolithic rod is circular.

8. A sensor according to claim 1, wherein a transverse section of the monolithic rod is polygonal, with a number of faces of the transverse section being even.

9. A sensor according to claim 1, wherein the bearing surfaces of the monolithic rod are flat.

10. A sensor according to claim 1, wherein the bearing surfaces of the monolithic rod are rounded.

11. The sensor of claim 10, wherein the bearing surfaces are spherical.

12. A compression stress sensor comprising:

a body comprising a monolithic rod having a longitudinal axis of symmetry, the monolithic rod having two end faces that provide bearing surfaces to receive forces to be measured along the longitudinal axis, the monolithic rod having at least one group of traversing open passages formed as apertures passing therethrough so that said passages within a given said group intersect one another, each said passage lying in a plane perpendicular to the longitudinal axis, so that the passages define measurement columns therebetween; and a strain gauge fixed to a surface of each said measurement column.

13. A sensor according to claim 12, having at least six said traversing passages in said group distributed uniformly around the longitudinal axis of the body.

14. A sensor according to claim 13, comprising a plurality of said groups of traversing passages disposed along the longitudinal axis with the groups aligned with one another.

15. A sensor according to claim 12, wherein a transverse section of the monolithic rod is circular.

* * * * *